(12) United States Patent
Goodman et al.

(10) Patent No.: US 8,594,833 B2
(45) Date of Patent: Nov. 26, 2013

(54) PROGRAMMABLE PRODUCT PICKING APPARATUS

(75) Inventors: James A. Goodman, Highland Park, IL (US); Michael James Johnson, Spokane, WA (US)

(73) Assignee: Pearson Packaging Systems, Spokane, WA (US)

( * ) Notice: Subject to any disclaimer, the term of this patent is extended or adjusted under 35 U.S.C. 154(b) by 461 days.

(21) Appl. No.: 12/916,358

(22) Filed: Oct. 29, 2010

(65) Prior Publication Data

US 2012/0109362 A1 May 3, 2012

(51) Int. Cl.
*B65G 47/90* (2006.01)

(52) U.S. Cl.
USPC ........... 700/214; 700/230; 700/216; 198/610; 198/468.3; 294/65

(58) Field of Classification Search
USPC ....................................................... 700/214
See application file for complete search history.

(56) References Cited

U.S. PATENT DOCUMENTS

| | | | | |
|---|---|---|---|---|
| 5,575,376 A * | 11/1996 | Colamussi | ................ | 198/468.3 |
| 6,011,998 A * | 1/2000 | Lichti et al. | ................... | 700/230 |
| 6,826,444 B2 * | 11/2004 | Herzog | ......................... | 700/213 |
| 7,954,869 B2 * | 6/2011 | Shim et al. | ...................... | 294/65 |
| 8,240,726 B2 * | 8/2012 | Subotincic | ...................... | 294/65 |
| 8,286,409 B2 * | 10/2012 | Junghans | ........................ | 53/448 |
| 2012/0085623 A1 * | 4/2012 | Wipf | ............................. | 198/610 |

* cited by examiner

*Primary Examiner* — Gene Crawford
*Assistant Examiner* — Kyle Logan
(74) *Attorney, Agent, or Firm* — Lee & Hayes, PLLC

(57) ABSTRACT

Techniques for construction and operation of a programmable product picking apparatus are described herein. Such an apparatus picks up product according to a first spacing (e.g., from a conveyor) and releases the product according to a second spacing (e.g., into a carton). In one possible configuration, a fixed matrix plate defines at least first and second rows of slots. Two movable matrix plates, one that moves right-then-left and one that moves left-then-right, move in opposite directions parallel to the fixed matrix plate according to strokes of pneumatic cylinders. Each of a plurality of product pickers is driven by one of the two movable matrix plates. As that plate moves, the product picker is also moved according to a slot defined in the movable matrix plate. Each product picker comes to a stop when it reaches an end of a slot defined in the fixed matrix plate.

20 Claims, 16 Drawing Sheets

PROGRAMMABLE PRODUCT PICKING APPARATUS

BACKGROUND

A product picking apparatus picks up product items according to a first spacing (e.g., product items arriving on a conveyor) and releases the product items according to a second spacing (e.g., product items placed into a carton). Known product picking apparatuses have used belts or endless tracks to frictionally engage and propel product pickers in a cyclical movement. The contacting surfaces responsible for generation of the friction that drives the product pickers are typically wear parts. Therefore, their condition is constantly changing. Accordingly, the movement of the product pickers is subject to slight variation over time. Such variations can result in "missed pickups" by one or more product pickers. This can result in production line shutdowns and/or cartons or cases that are "light" on product.

SUMMARY

Techniques for construction and operation of a programmable product picking apparatus are described herein. Such an apparatus picks up product items according to a first spacing (e.g., the spacing of product items arriving on a conveyor) and releases the product items according to a second spacing (e.g., the spacing required to place product items into a carton). In one possible configuration, a fixed matrix plate defines at least first and second rows of slots associated with two movable matrix plates. The two movable matrix plates move in opposite directions parallel to the fixed matrix plate according to strokes of pneumatic cylinders. That is, one movable matrix plate will move left-then-right, while the other movable matrix plate moves right-then-left. Each of a plurality of product pickers is moved by a pin inserted into one of the two movable matrix plates. Thus in one example, the product pickers may be in a uniformly spaced arrangement when both movable matrix plates are fully extended. Such spacing may be associated with grasping uniformly distributed product items from a conveyor system. Then, as the movable matrix plates move to a retracted position, one matrix plate moves some product pickers to the left, while the other movable matrix plate moves other product pickers to the right. At the retracted position, the product pickers are arrayed in clustered groups. Such groups may be associated with releasing product items into one or more cartons. Contact by the pin of each product picker with an end of a slot defined in the fixed matrix plate stops the product picker at the conclusion of movement by the movable matrix plate. The cycle may be repeated as required.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to apparatus(es), device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Figure 1:
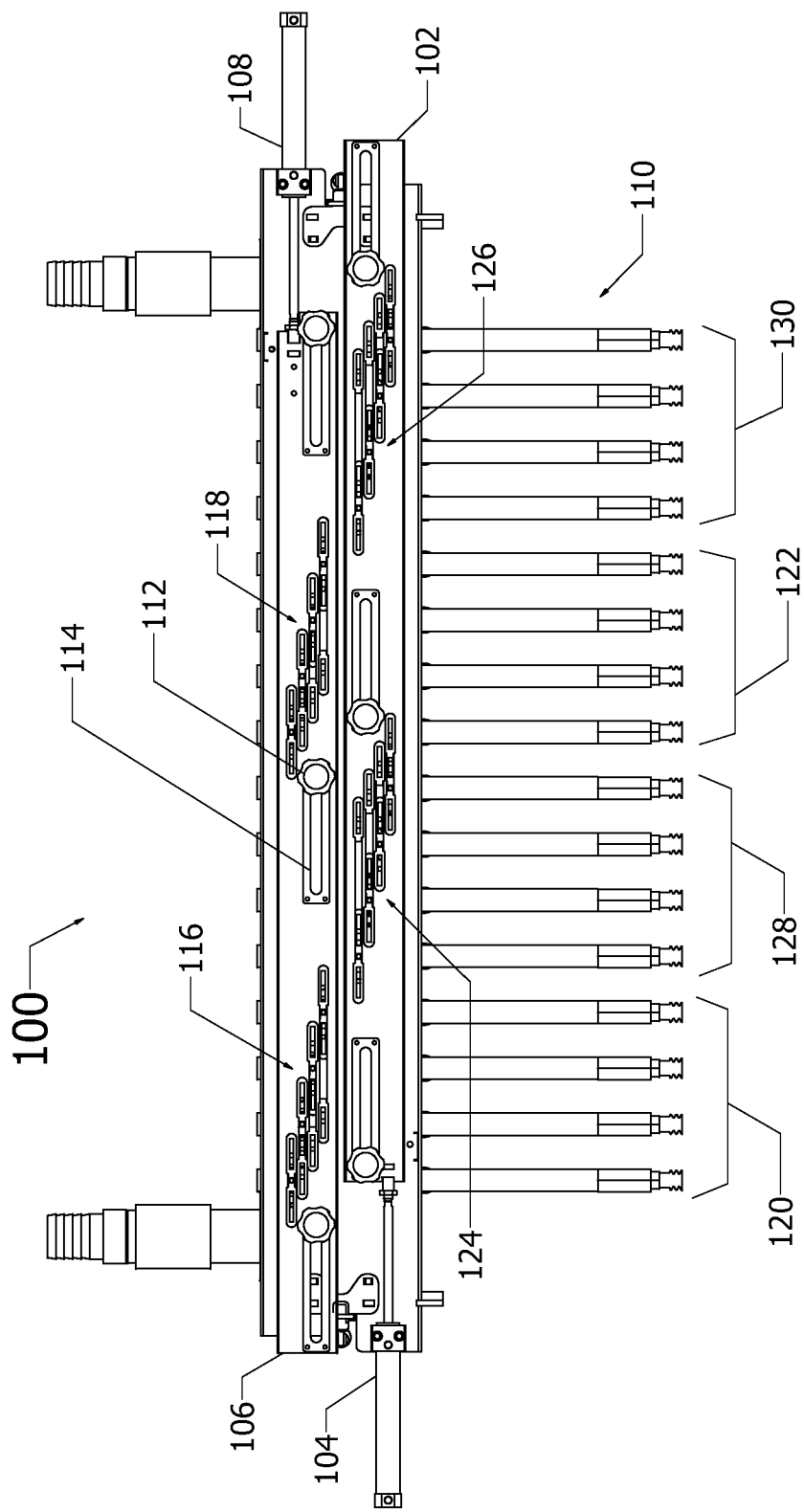
FIG. 1 is an orthographic view showing an example of a programmable product picking apparatus having both pneumatic cylinders and associated movable matrix plates fully extended to position sixteen product pickers in a uniformly spaced arrangement.

Techniques for construction and operation of a programmable product picking apparatus are described herein. Such an apparatus picks up product items according to a first spacing (e.g., product items arriving on a conveyor) and releases the product items according to a second spacing (e.g., product items placed into a carton). In one possible configuration, a fixed matrix plate defines first and second groups of rows of slots. Two movable matrix plates, one that moves right-then-left and one that moves left-then-right, move in opposite directions parallel to the fixed matrix plate, driven by strokes of respective pneumatic cylinders. One movable matrix plate is associated with each group of rows of slots on the fixed matrix plate. Each of a plurality of product pickers is driven by either the right-then-left movable matrix plate or the leftthen-right movable matrix plate. As that plate moves, a pin extending from each product picker is moved when movement of the plate results in an end of a slot defined in the movable matrix plate pushing the pin. Each product picker comes to a stop when its pin reaches an end of a slot defined in the fixed (non-moveable) matrix plate.

In operation, pneumatic cylinders move the movable matrix plates in opposite directions. Each product picker is attached by pin one of the two movable matrix plates. As the plates move, ends of slots defined in each movable plate come into contact with the pins extending from the product pickers. In most configurations, simultaneous movement of the two movable plates in opposite directions moves some product pickers in each direction. The product pickers stop moving as the movable matrix plates stop moving, due to the pneumatic cylinder ending its stroke. The product pickers also stop moving because—simultaneous to the end of the stroke of the pneumatic cylinder—each product picker reaches an end of a slot defined in the fixed matrix plate. Accordingly, movement of the matrix plates may result in uniform or desired spacing of the product pickers. The spacing of the product pickers may match that of product, allowing the pickers to pick up product, such as from a conveyor. The pneumatic cylinders may then retract, reversing the direction of the movable matrix plates, which again move in opposite directions. As each movable matrix plate moves, ends of slots defined in each movable matrix plate come into contact with the pins of the product pickers, moving them until the pneumatic cylinders have fully retracted and the pin of each product picker contacts an end of a slot in the fixed matrix plate. At this point, the product pickers are in two or more tightly spaced groups, and may drop off product, such as into a carton.

The discussion herein includes several sections. Each section is intended to be non-limiting; more particularly, this entire description is intended to illustrate components which may be utilized in a programmable product picking apparatus, but not components which are necessarily required. The discussion begins with a section entitled "Example Programmable Product Picking Apparatus," which describes one example apparatus that illustrates the techniques described herein. Next, a section entitled "Example Control Structure" illustrates and describes an electronic control system to control operation of the programmable product picking apparatus. A further section, entitled "Example Flow Diagrams" illustrates and describes techniques that may be used to support the programmable product picking apparatus. Finally, the discussion ends with a brief conclusion.

This brief introduction, including section titles and corresponding summaries, is provided for the reader's convenience and is not intended to limit the scope of the claims.
Example Programmable Product Picking Apparatus FIG. 1 is an orthographic view showing an example of a programmable product picking apparatus 100. The programmable product picking apparatus 100 includes a first and second movable matrix plates, each driven by a pneumatic cylinder. In particular, a right-then-left movable matrix plate 102 is shown fully extended to the right, as a result of full extension of a first drive or pneumatic cylinder 104. A left-then-right movable matrix plate 106 is shown fully extended to the left, as a result of full extension of a second drive or pneumatic cylinder 108. Full extension of both cylinders 104, 108 results in movement of a plurality of product pickers 110 to assume a uniformly spaced arrangement, as seen in FIG. 1. Note that the uniform spacing is exemplary only; the spacing could be formed as needed, to pick or release product items as indicated by a particular application.

It should be noted that while one movable matrix plate is described as "left-then-right," and the other as "right-then-left," these assignments are somewhat arbitrary, in that the cycle of product picking and product placing can involve repetitive motion without a clear starting and ending point. Also, while the pneumatic cylinders are described as being fully extended or retracted, this is by its very nature arbitrary, in that connection of each cylinder to an opposite end of the associated movable matrix would result in the opposite pattern of extension and retraction. Also, while pneumatic cylinders 104, 108 are illustrated, other power sources could alternatively be employed.

In the example of FIG. 1, each movable matrix plate 102, 104 is secured to an underlying framework (illustrated as noted, elsewhere) by a plurality of fasteners 112. Each fastener 112 allows the associated movable matrix plate (102 or 106) to move within an associated slot 114, having a length equal to a stroke length of the associated pneumatic cylinder 104, 108.

In the example of FIG. 1, the left-then-right movable matrix plate 106 includes two groups of slots 116, 118. In the illustrated example of FIG. 1, the group of slots 116 includes four rows, each row having one slot. The slot in each row of the grouping 116 moves one of the product pickers in the grouping 120, and the slot in each row of the grouping 118 moves one of the product pickers in the grouping 122. For example, a pin (e.g., shown at 606 in FIG. 6) extending from the left-most product picker in grouping 120 passes through the slot in the upper row of the grouping of slots 116 defined in the moveable matrix plate 106. Thus, movement of the movable matrix plate 106 to the left by extension of cylinder 108 has moved the product pickers in the groups 120, 122 of product pickers to the left. All of the product pickers in the groupings 120, 122 will be moved to the right when the cylinder 108 retracts the matrix plate 106 to the right. (Note that in some circumstances, a product picker is not required to move. In such circumstances, the slot in the movable matrix plate could be of sufficient length to travel without contact to a pin extending from such a product picker. For example, the slot defined in the movable matrix plate could be generally equal in length to the stroke length of the pneumatic cylinder.)

Similarly, the groupings of slots 124, 126 move the groupings of product pickers 128, 130 in both the right and left directions, according to movement of the movable matrix plate 102 and associated cylinder 104.

Figure 2:
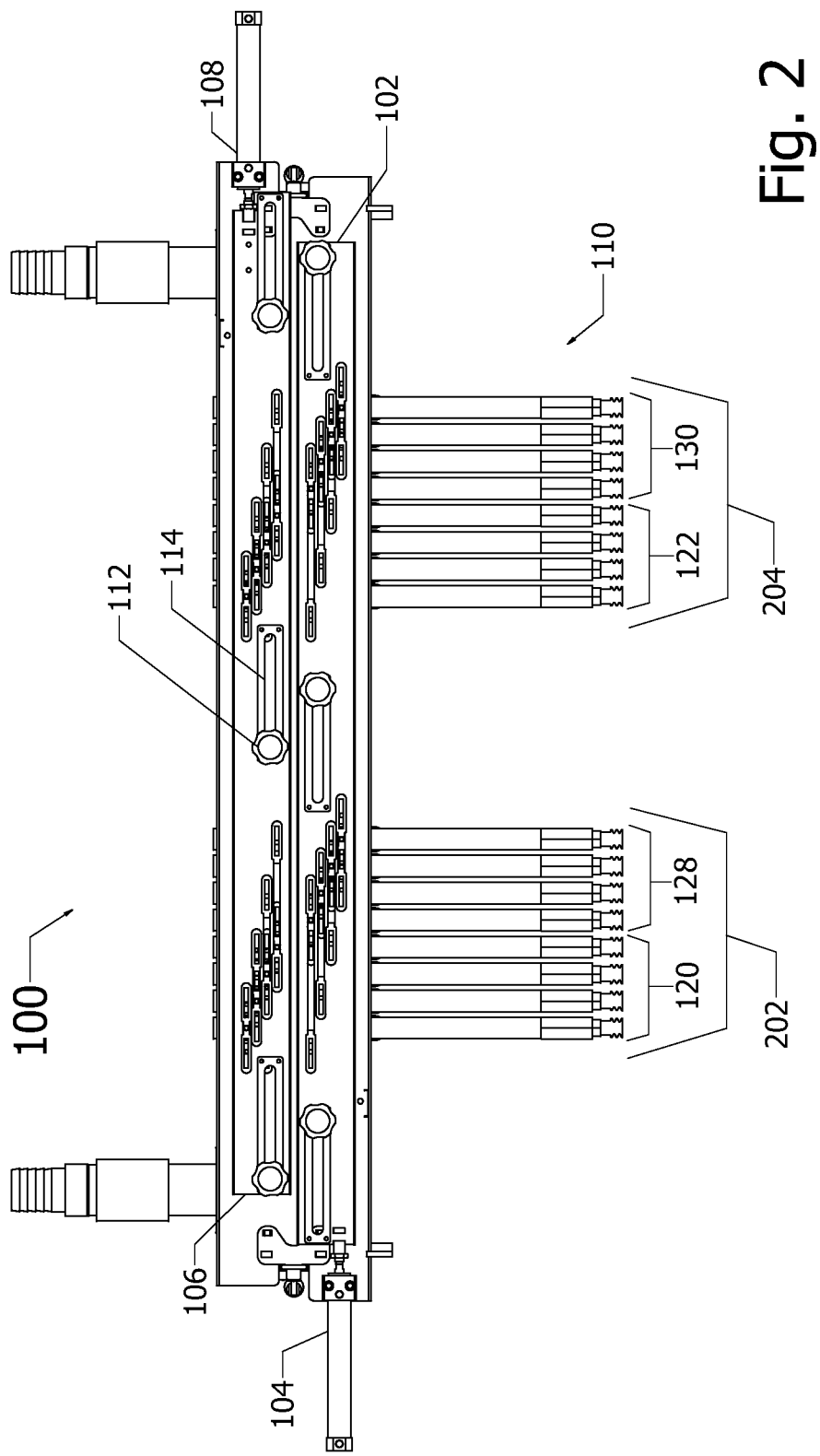
FIG. 2 is an orthographic view showing an example of a programmable product picking apparatus having both pneumatic cylinders and associated movable matrix plates fully retracted to group product pickers into two tightly grouped clusters.

FIG. 2 is an orthographic view showing the programmable product picking apparatus 100 having both pneumatic cylinders 104, 108 and associated movable matrix plates 102, 106 fully retracted. As noted, while the cylinders 104, 108 are illustrated as retracted, if they were attached to opposite sides of their associated movable matrix plates 102, 106, the cylinders would be extended. Thus, FIG. 2 shows the product pickers 110 grouped into two tightly organized clusters 202, 204. In particular, the product pickers of groups 120 and 122 have been moved to the right by movable matrix plate 106 and pneumatic cylinder 108. Similarly, the product pickers of groups 128, 130 have been moved to the left by movement of movable matrix plate 102 and pneumatic cylinder 104. This movement resulted in the formation of the clusters 202, 204 of product pickers. Note that the formation of clusters is by example only, and different numbers of clusters could be formed. Thus, the spacing of product pickers could be programmed as needed to pick or release product items as indicated by a particular application. Also, note that while the fasteners 112 that attach the movable matrix plates 102, 106 have not moved, movement of the movable matrix plates has located the travel slots 114 on the opposite sides of the fasteners.

Figure 3:
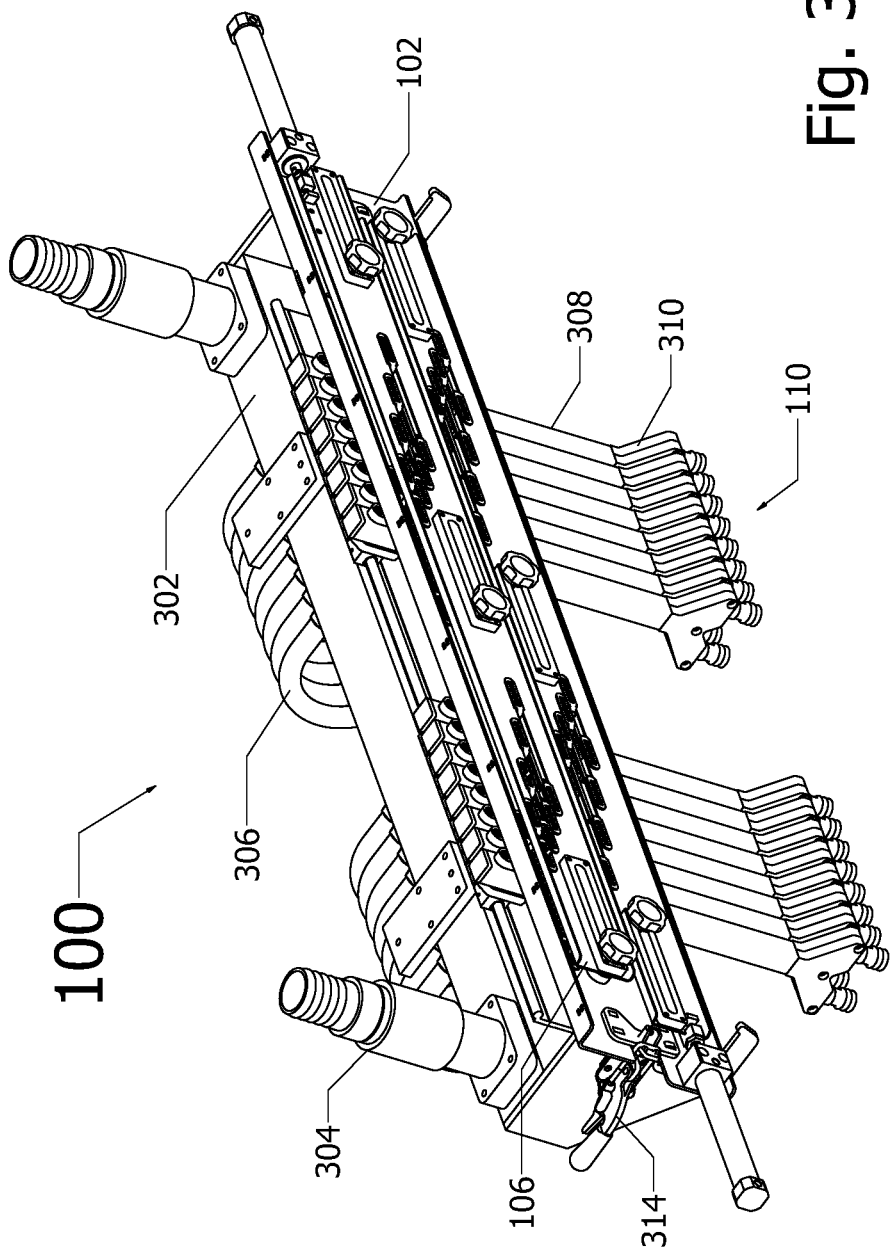
FIG. 3 is a perspective view of the example programmable product picking apparatus of FIG. 1.

FIG. 3 is a perspective view of the example programmable product picking apparatus 100 of FIG. 1. In this view, a plenum 302 is visible. The plenum 302 defines in internal or central cavity, within which low air pressure may be maintained. Low or negative air pressure (i.e., air pressure less than sea level atmospheric air pressure) is used by the product pickers 110 to attach to or "grasp" product items. Valves may be used to release the partial vacuum (i.e., the low or negative pressure), and to thereby release the product items. Exhaust ports 304 allow attachment of tubing to remove air from the plenum 302, as needed, to maintain a desired air pressure within the plenum. Exhaust tubes 306 connect each product picker 110 to the plenum. Each product picker 110 may include a tube body 308 and lower manifold 310. The use of a manifold may depend on the arrangement of the product to be picked. Each product picker may include one or more grippers or feet 312. The grippers 312 may be made of flexible material, which forms a bond with a product item, in view of the low or negative air pressure within the tube body 308 and grippers.

A fastener 314 releases the fixed matrix plate (discussed in FIG. 4) and the movable matrix plates 102, 106. Removal and replacement of these matrix plates allows replacement plates to be installed. The replacement plates could change the locations to which the product pickers are moved. Accordingly, new matrix plates "reprogram" the programmable product picking apparatus 100.

Figure 4:
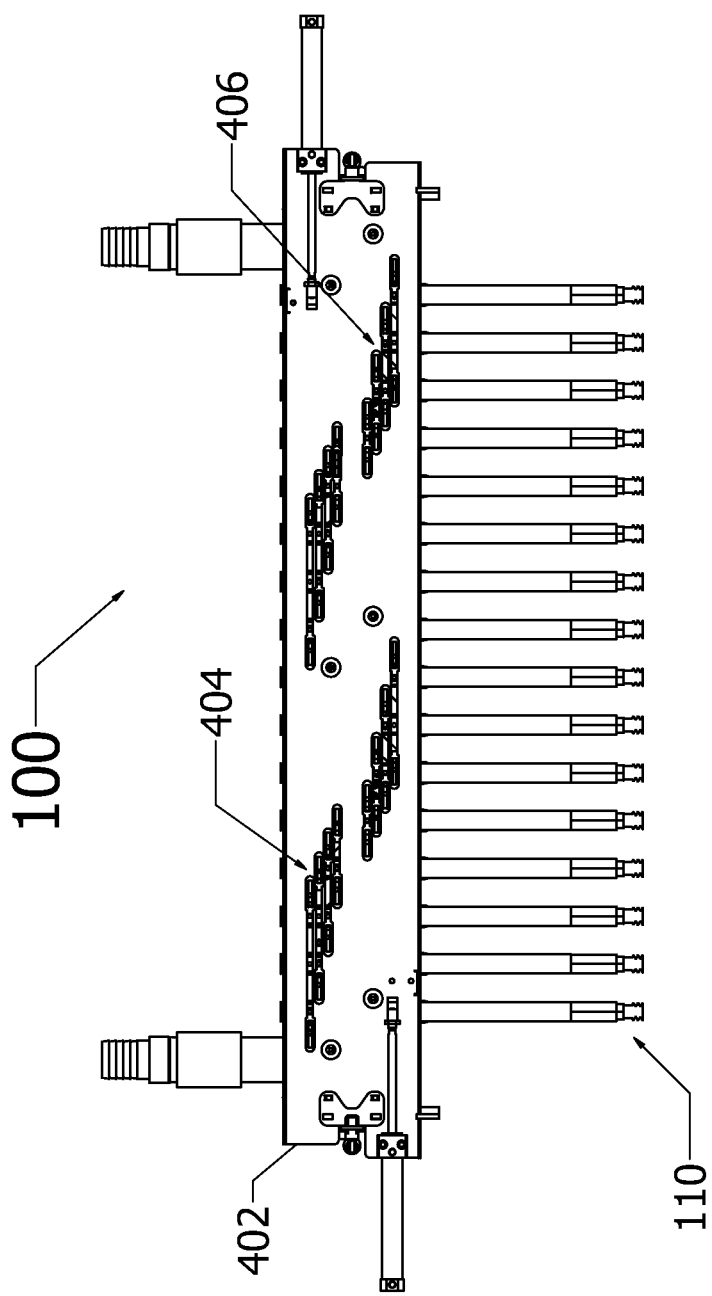
FIG. 4 is an example of a programmable product picking apparatus similar to that of FIG. 1, but with the movable matrix plates removed to show aspects of the fixed matrix plate.

FIG. 4 shows an example of the programmable product picking apparatus 100 having the movable matrix plates removed to show aspects of the fixed matrix plate 402. A purpose of the fixed matrix plate 402 is to prevent further movement of product pickers after movement of a movable matrix plate stops. That is, the fixed matrix plate 402 prevents inertia from repositioning the product pickers after the movable matrix plates—which are pushing the product pickers—stop moving.

At least a first row of slots 404 and a second row of slows 406 are defined in the fixed matrix plate 402. Thus, the first row of slots 404 is representative of one or more rows of slots that are each associated with product pickers moved by a left-then-right movable matrix plate, and the second row of slots 406 is representative of one or more rows of slots that are each associated with product pickers moved by a right-then-left movable matrix plate. As will be seen in additional drawing figures, a pin extending from each product picker 110 passes through one of the two movable matrix plates 102, 106 (removed in FIG. 4 to reveal the fixed matrix plate 402) and also passes through the fixed matrix plate 402. Thus, when a pin extending from each product picker is at one end of the slot defined in the fixed matrix 402, then the product picker is in a uniformly spaced (or other desired) arrangement (such as seen in FIG. 1). When the pin extending from a product picker is at the other end of the slot defined in the fixed matrix 402, then the product picker may be in a clustered or grouped arrangement (such as seen in FIG. 2, or other desired arrangement).

The operation of the structure disclosed by FIGS. 1-4 can be summarized. Each product picker 110 is moved by one of the movable matrix plates (102 or 106) between a location associated with the a first spacing configuration (e.g., the example of uniform spacing seen in FIG. 1) to a location associated with a second spacing configuration (e.g., the grouped configuration seen in FIG. 2). Each product picker 110 is moved by a force applied to a pin extending from that product picker and through the slot of one movable matrix plate. A longer slot in the movable matrix plate translated into less movement by the product picker, since the movable matrix plate moves until the end of the slot contacts the pin of the product picker before the product picker starts to move. When the cylinder (104 or 108) associated with that movable matrix plate is fully extended (or retracted) force will no longer be applied to the product picker by the movable matrix plate. However, the pin of the product picker also extends through a slot defined in the fixed matrix plate. The slot defined in the fixed matrix plate 402 ends at the point when the movable matrix plate stops pushing the product picker. Accordingly, the fixed matrix plate stops the product picker from moving and counteracts inertial forces which might continue that movement.

Figure 5:
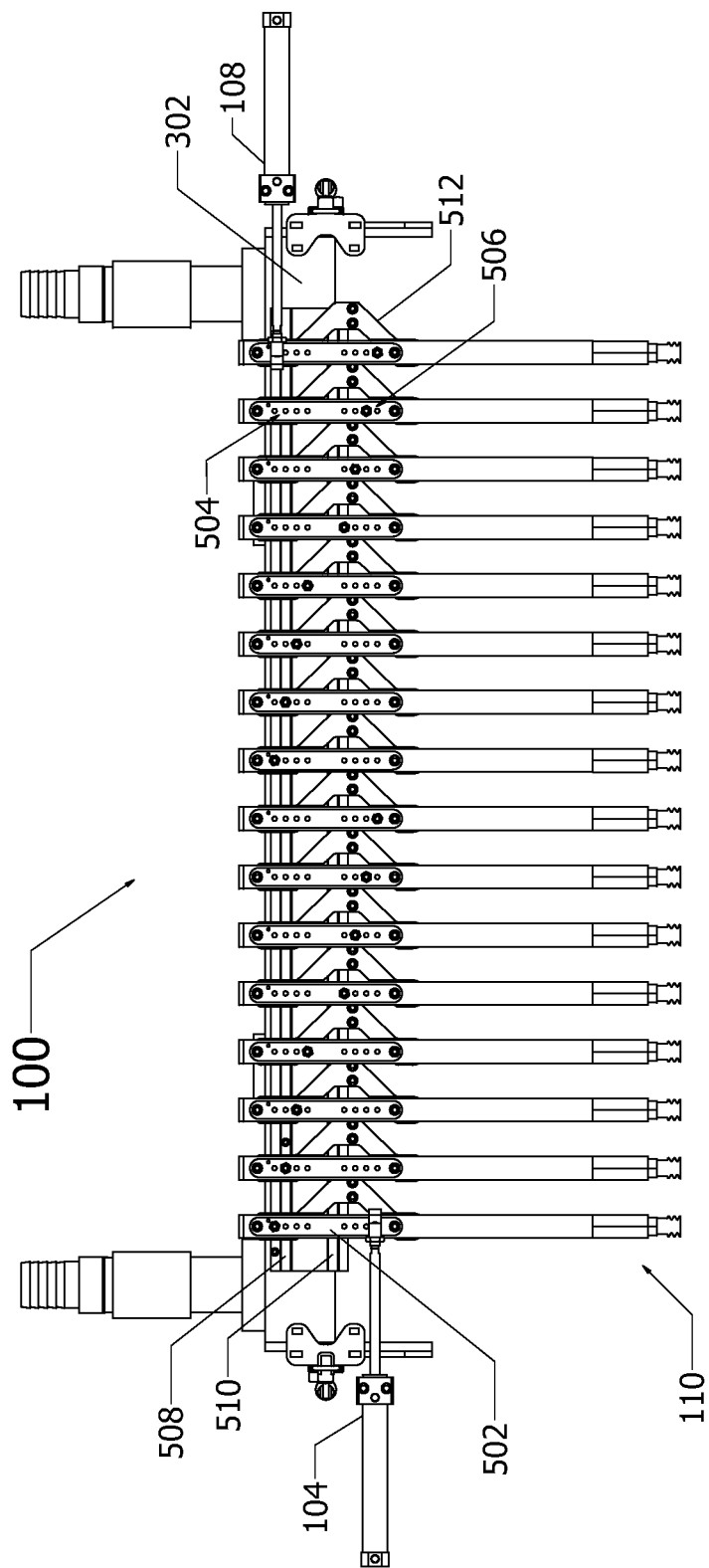
FIG. 5 is an example of a programmable product picking apparatus similar to that of FIG. 4, but with the fixed matrix plate removed to show aspects of the product pickers.

FIG. 5 is an example of a programmable product picking apparatus 100 similar to that of FIG. 4, but with the fixed matrix plate removed to show aspects of the product pickers 110. Similarly, while the pneumatic cylinders 104, 108 are shown, the movable matrix plates that they move have been removed to show aspects of the product pickers 110. In the example of FIG. 5, the plenum 302 functions as a frame, and provides a structural framework, in addition to providing low or negatively pressured air to the product pickers 110. Alternatively, a separate frame may be used. With the fixed matrix plate removed, a "front" side of the product pickers 110 is shown. Each product picker may include a plate 502 to support a pin. Each plate 502 may include a plurality of upper pin attachment points 504 and a plurality of lower pin attachment points 506. Accordingly, a pin may be attached to each product picker to associate that product picker with any row of either of the two movable matrix plates 102, 106.

Upper and lower guide rods 508, 510 may be attached for support to a framework, if available, or directly to the plenum 302. The guide rods 508, 510 provide support for the product pickers 110, and allow them to move horizontally to the left and right. In the example shown, the guide rods are parallel, and are vertically stacked, resulting in an upper guide rod 508 and a lower guide rod 510. As will be discussed in FIGS. 9 and 10, upper and lower bearing surfaces support each product picker 110 to guide on the guide rods 508, 510. The lower bearing surface is attached to a bracket 512, which offsets the lower bearing surface to the right. Thus, from the perspective of FIG. 5, each product picker 110 attaches to the lower guide rod 510 at a position to the right of a position wherein the product picker attaches to the upper guide rod 508.

Figure 6:
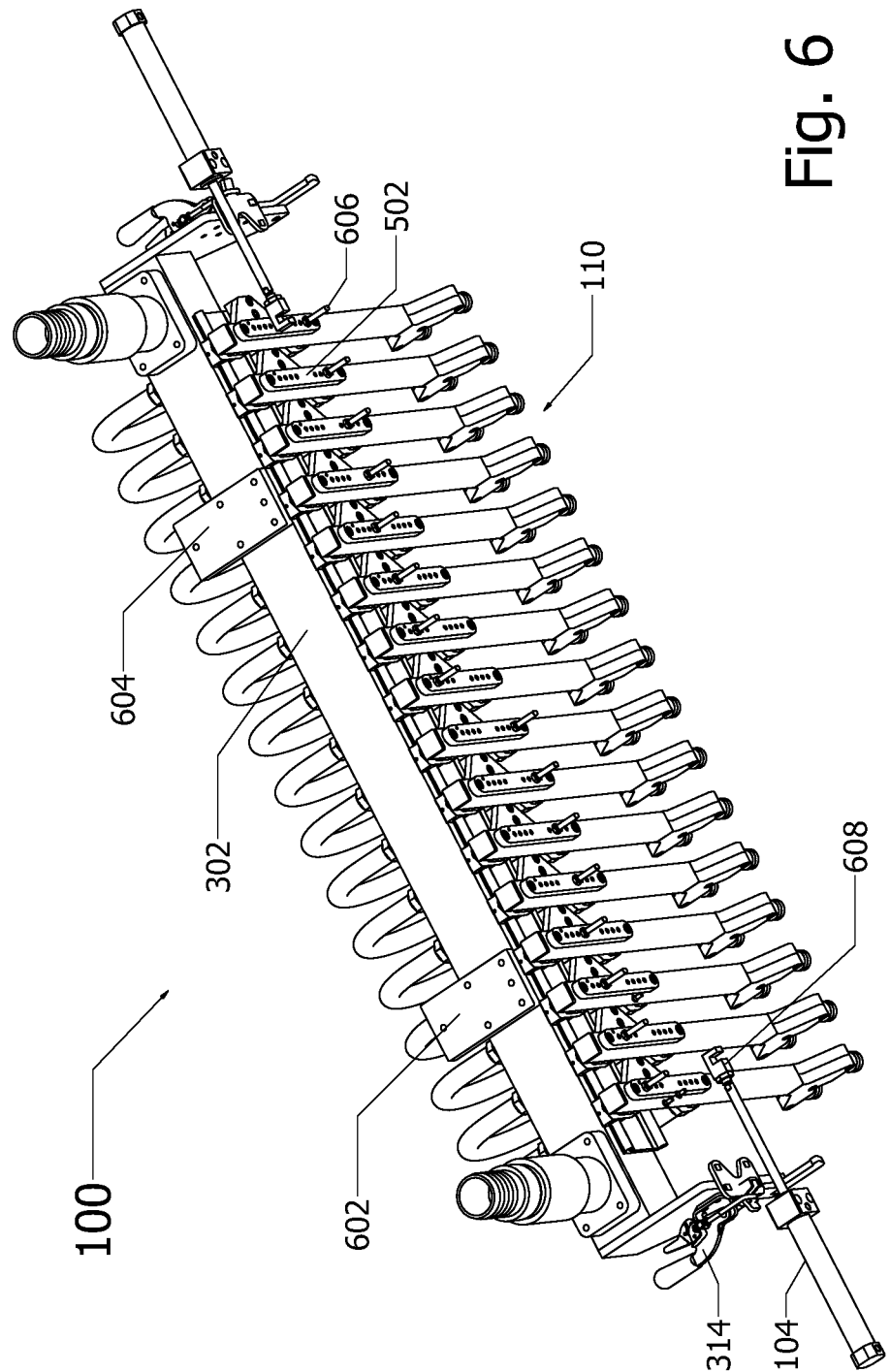
FIG. 6 is a perspective view of a programmable product picking apparatus similar to that of FIG. 3, but with the movable and fixed matrix plates removed to show aspects of the product pickers.

FIG. 6 is an example of a programmable product picking apparatus 100 similar to that of FIG. 3, but with the movable and fixed matrix plates removed to show aspects of the product pickers 110. In the view of FIG. 6, two attachment or fastening plates 602, 604 allow attachment of the programmable product picking apparatus 100 to a gantry or other movable device or apparatus. Such a device may assist in the event that the product pickers 110 grasp product items organized according to a first spacing at a first location, and then release the product items organized according to a second spacing at a second location.

Each product picker 110 may include a pin 606 extending from the plate 502. In general, for nearby product pickers, each pin 606 is attached to a different row of the plate 502. This prevents conflict caused by two pins traveling in the same slot defined in the movable matrix plate. Additionally, pins 606 should be attached to a location on the plate 502 that is associated with a desired movable matrix plate.

In the view of FIG. 6, the fixed and movable matrix plates have been removed, to reveal aspects of the product pickers 110. However, the coupler 608 of the pneumatic cylinder 104 which drives a movable matrix plate is shown.

Figure 7:
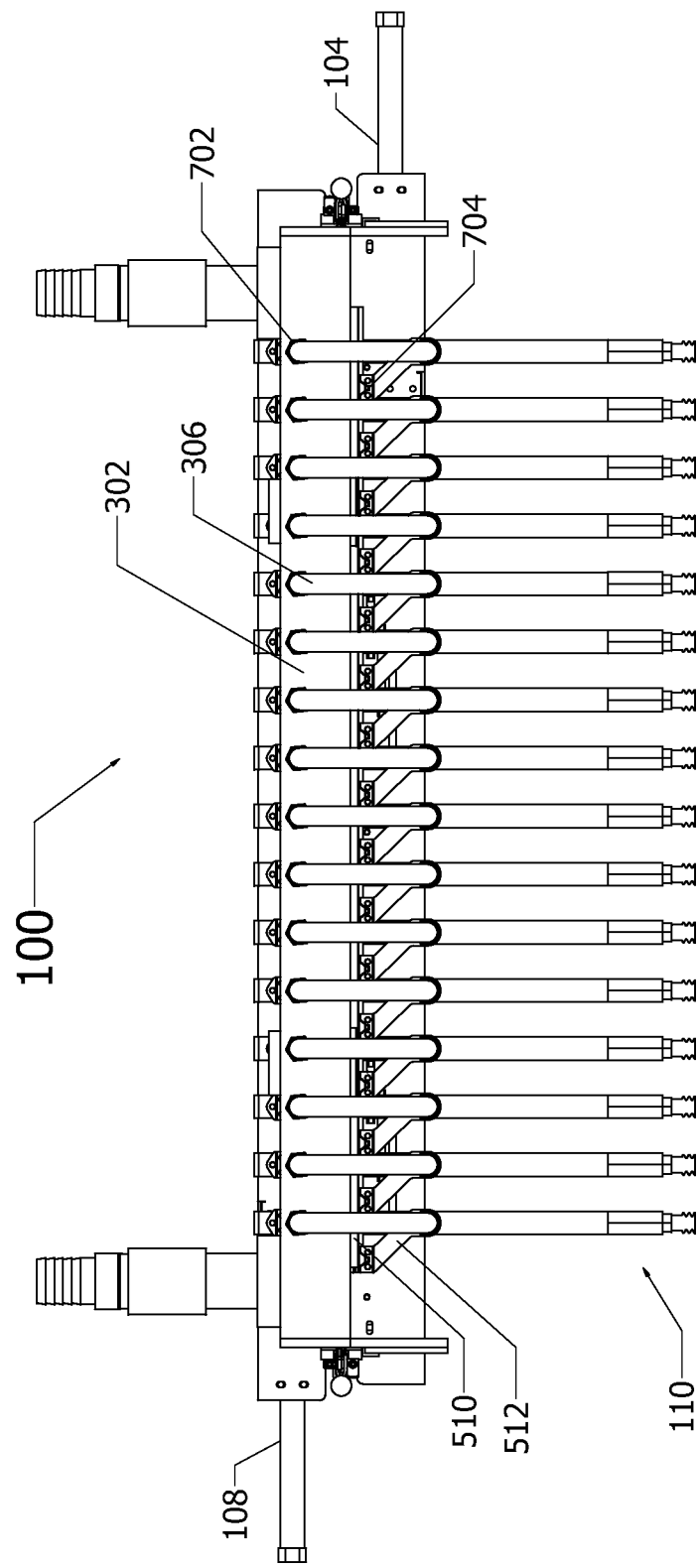
FIG. 7 is an example of a programmable product picking apparatus similar to FIG. 1, but showing the reverse side.

FIG. 7 is an example of a programmable product picking apparatus 100 similar to FIG. 1, but showing the reverse side. Accordingly, the pneumatic cylinders 104, 108 appear on reversed sides of the apparatus, and the exhaust tubes 306 of each product picker 110 are visible. Exhaust tubes 306 are attached to the plenum 302 at a connector 702. The exhaust tubes 306 may be made of a flexible material. The flexibility allows the product picker 110 to move, while the exhaust tube continues to connect the product picker to the plenum.

FIG. 7 provides a reverse view of the bracket 512 that carried a lower bearing surface 704 that slides on the lower guide rod 510. Thus, in the view of FIG. 7, for any product picker 110, the lower bearing surface 704 is below and to the left of the upper bearing surface (best seen in FIG. 9).

Figure 8:
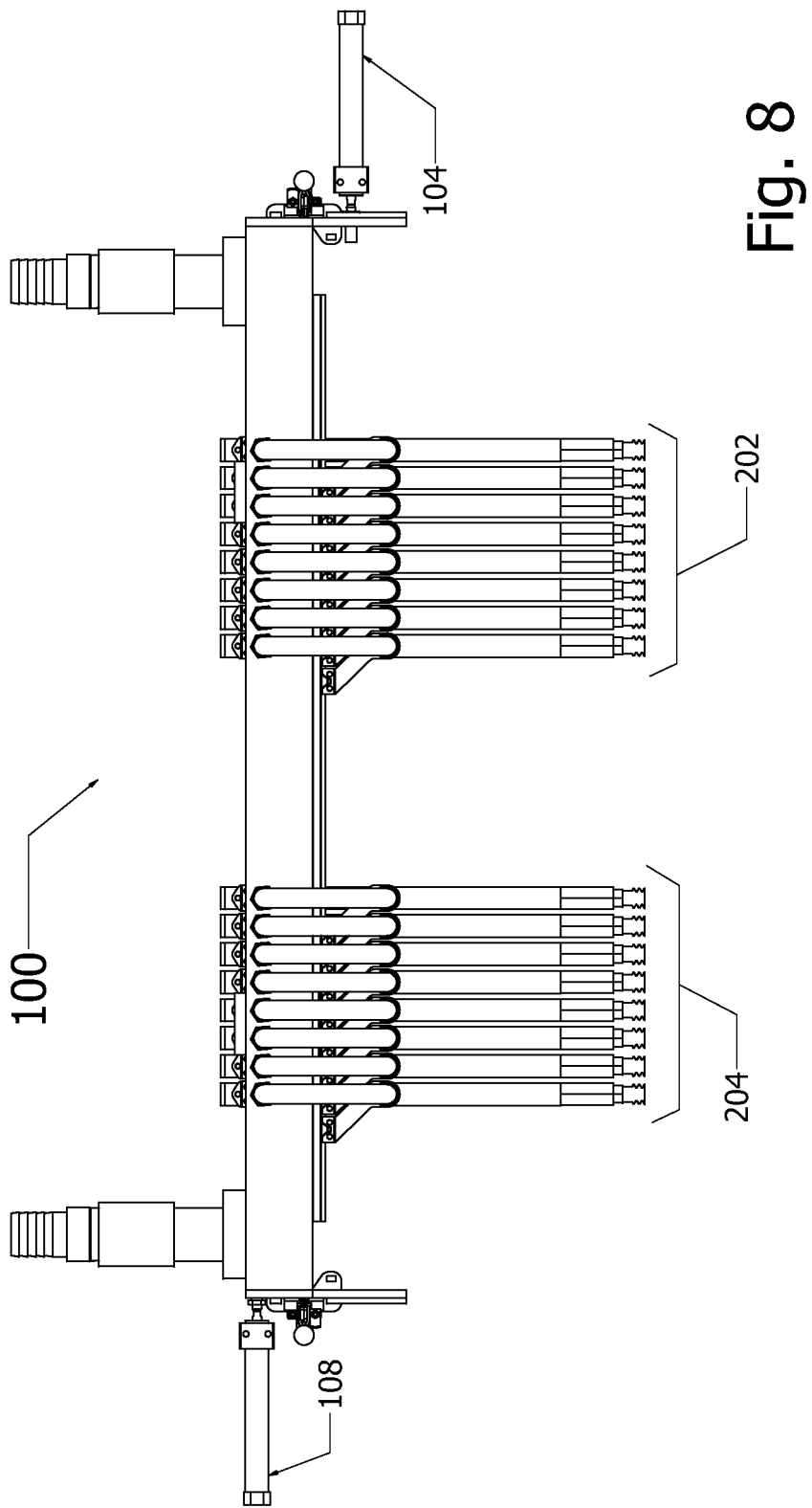
FIG. 8 is an example of a programmable product picking apparatus similar to FIG. 2, but showing the reverse side.

FIG. 8 is an example of a programmable product picking apparatus 100 similar to FIG. 2, but showing the reverse side. In particular, the pneumatic cylinders 104, 108 have fully retracted. The retraction moves the product pickers 110 from the uniformly spaced arrangement seen in FIG. 1, to the arrangement seen in FIG. 2, wherein the product pickers are clustered in two groups 202, 204.

The number of groups in which the product pickers are clustered is arbitrary. For example, the product pickers could be clustered in one larger group, or three smaller groups. In particular, one larger group would reduce the spacing between product pickers, when compared to FIG. 1. The number of product pickers 110, and the number of groups and spacing between product pickers when clustered (such as in the example of FIG. 8) may be determined by the circumstances of a particular application, such as the number of product items on a conveyor belt, their spacing, the number of cartons to be filled with those product items and their spacing and other factors.

Figure 9:
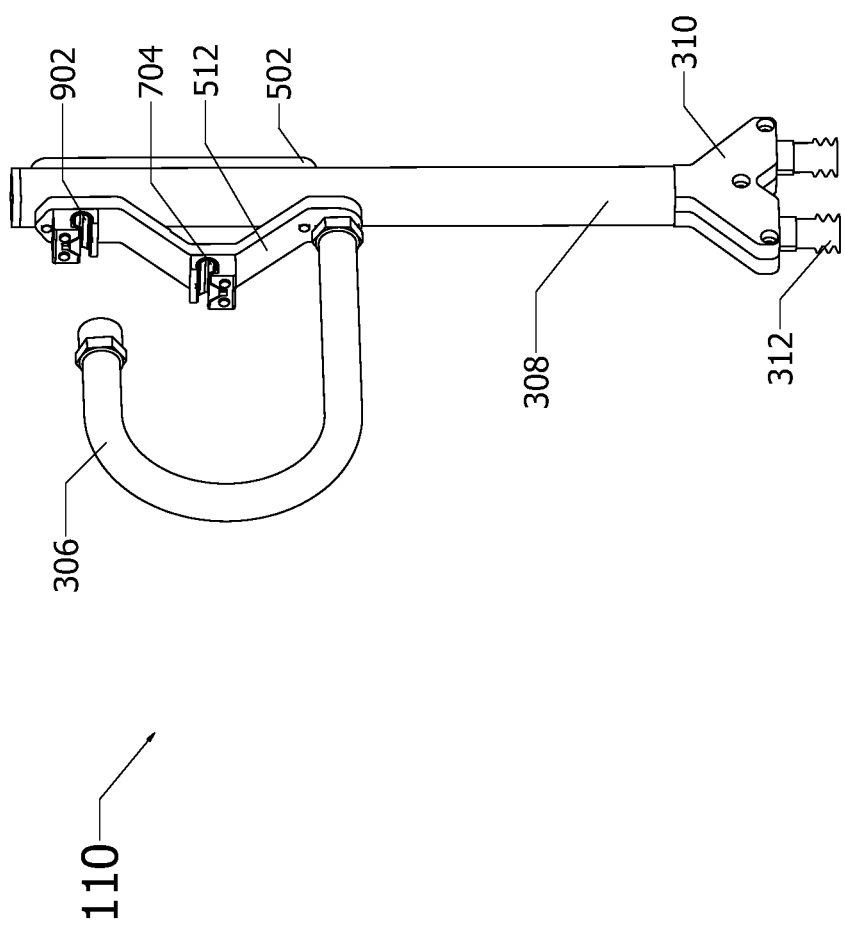
FIGS. 9 and 10 are two views of an example product picker, separated from the programmable product picking apparatus to show more detail.

FIG. 9 shows an example product picker 110 separated from the programmable product picking apparatus to which it may be attached. In operation, the product picker 110 slides along vertically stacked upper and lower guide rods (not shown), supported by an upper bearing surface 902 and a lower bearing surface 704. The lower bearing surface is offset slightly, by the bracket 512. The offset provides greater strength between the connection between the product picker 110 and the guide rods. The product picker 110 has a tube body 308, on which is mounted a plate 502 to support a pin. The tube body 308 is attached to a manifold 310 which may be attached to two grippers or feet 312. In operation, the feet 312 may grip product items, using low or negative air pressure resulting from air removed through exhaust tube 306. Note that while two grippers 312 are shown extending from the manifold 310, any number of grippers could be provided, depending on the requirements of a particular implementation.

Figure 10:
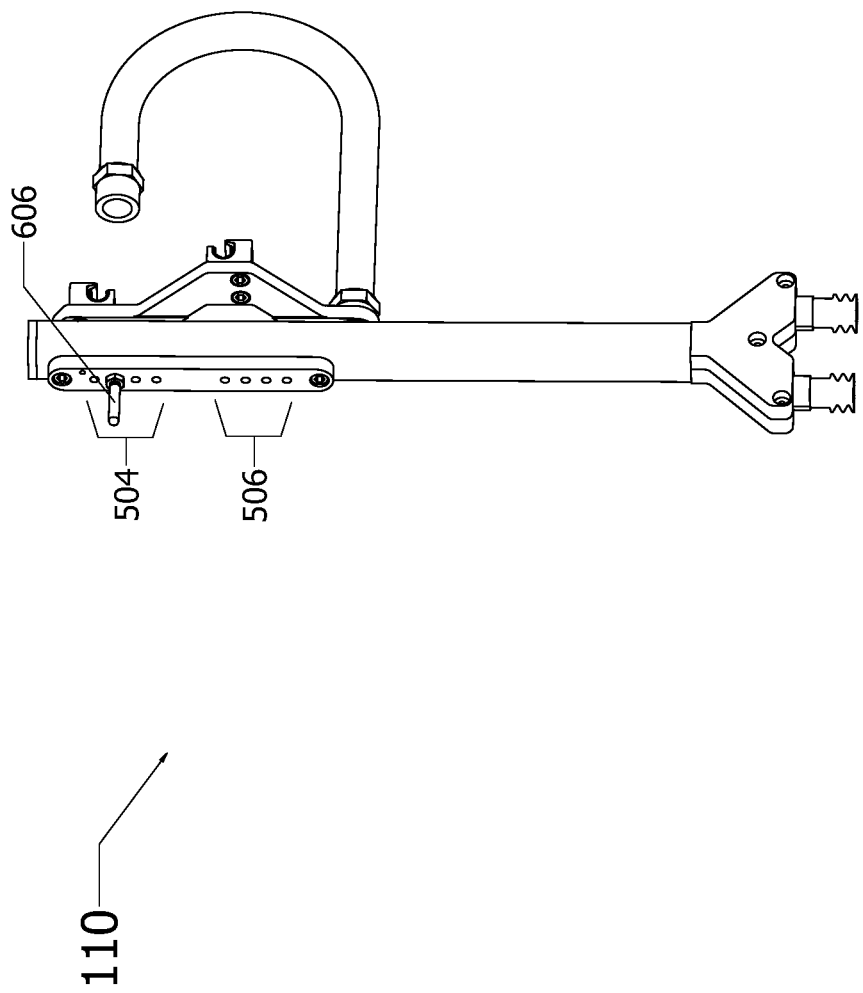

FIG. 10 shows a reverse angle of the product picker 110 of FIG. 9. The attachment plate 502 is more clearly seen in this view. Upper pin attachment points 504 allow attachment of a pin (such as pin 606 of FIG. 6), which would be located to pass through a slot defined in an upper movable matrix plate (e.g., movable matrix plate 106 of FIG. 1). Lower pin attachment points 506 allow attachment of a pin, which would be located to pass through a slot defined in a lower movable matrix plate (e.g., movable matrix plate 102 of FIG. 1). Only one pin is attached to any product picker 110, so that the product picker moves in response to movement of only one movable matrix plate.

Figure 11:
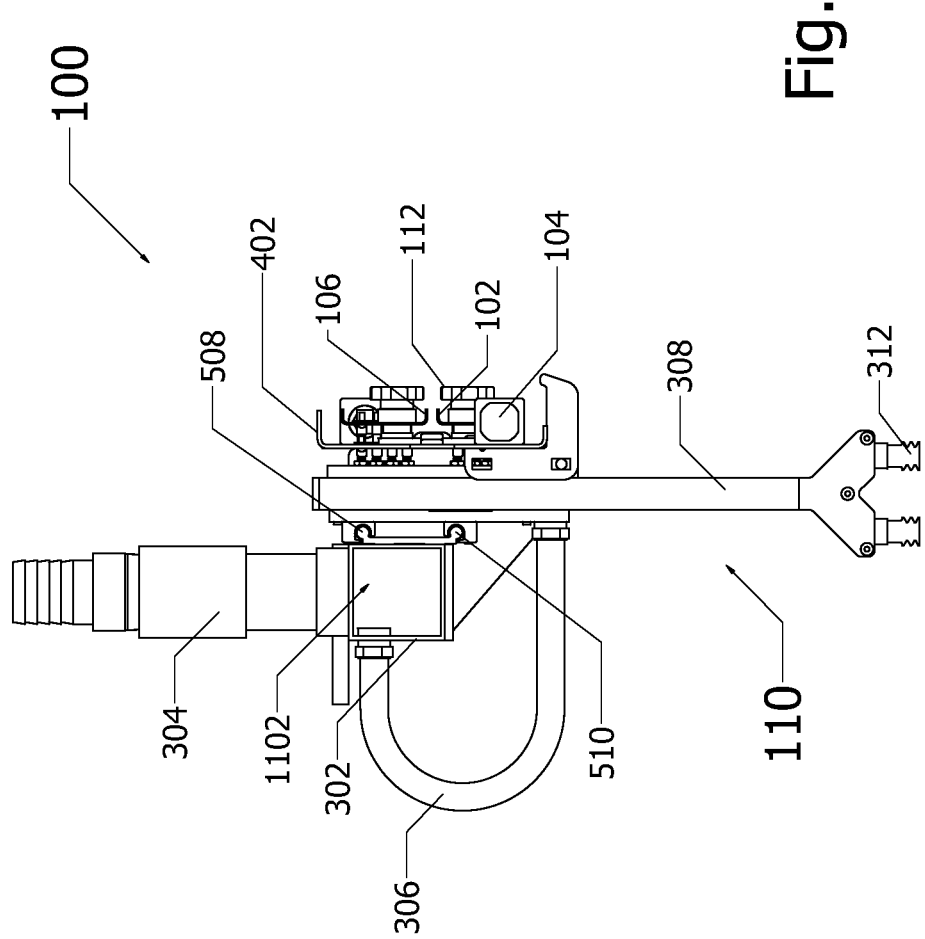
FIG. 11 shows a cross-sectional view of an example programmable product picking apparatus, taken perpendicular to a direction of product picker travel.

FIG. 11 shows a cross-sectional view of an example programmable product picking apparatus 100, taken perpendicular to a direction of product picker travel. Accordingly, the plenum 302 is seen in cross-section, revealing a central or inner cavity 1102. In operation, air moves into the gripper feet 312 of a product picker 110, thereby allowing the gripper 312 to attach to a product item. The air moves through the tube body 308 of the product picker 110, and is exhausted through tube 306. Therefore, low or negative pressure within the inner cavity 1102 of the plenum 302 assists each product picker 110 to grasp product items.

Each product picker 110 slides on the upper and lower guide rods 508, 510. One pin (not seen in this view) from each product picker 110 extends through the fixed matrix plate 402 and one of the two movable matrix plates 102, 106. The fasteners 112 securing the movable matrix plates are seen, and a cross-sectional view of the pneumatic cylinder 104 is seen.

Figure 12:
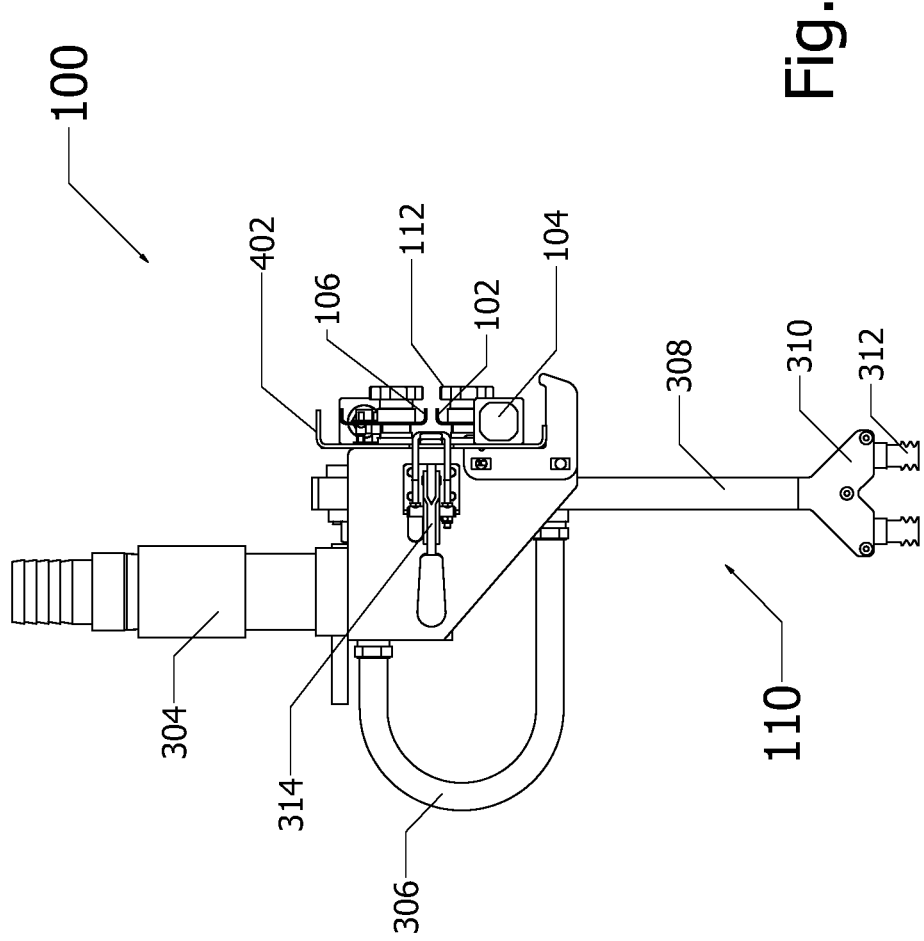
FIG. 12 shows an end-view of an example of programmable product picking apparatus.

FIG. 12 shows an end-view of an example of programmable product picking apparatus. The end-view of FIG. 12 shows the arrangement of the fastener 314, which allows attachment and removal of the fixed matrix plate 402 and two movable matrix plates 102, 106. By removing the matrix plates, different matrix plates may be substituted. Such substitution has the effect of re-programming the programmable product picking apparatus 100. The substitution of different matrix plates can result in different slot lengths and locations for some or all of the product pickers 110. As a result, the number, spacing, location, arrangement, etc., of the clustered groups of product pickers can be changed to meet a desired configuration. Thus, while FIG. 2 shows an example of two clustered groups of product pickers, other different clustered groups could be created by replacement of the matrix plates 102, 106 and/or 402.

Note that in general, the combined length of the slots defined in the movable matrix plate (either 102 or 106) and the fixed matrix plate 402 associated with any product picker 110 is the length of the stroke of the associated pneumatic cylinder 104 or 108. Thus, the pneumatic cylinder must extend by a length equal to the length of the slot defined in the movable matrix plate 102 or 106, before the end of the slot contacts the pin of the associated product picker, and the product picker starts to move. At the point when the cylinder is fully extended, the pin of the product picker contacts the end of the slot defined in the fixed matrix plate 402. Accordingly, the combined lengths, of the slots in the movable matrix plate 102 or 106 and the fixed matrix plate 402 associated with any product picker, is approximately equal to the stroke length of the pneumatic cylinder or other powering device plus a diameter of the pin.

Two special cases exist. If the slot associated with any product picker in the movable matrix plate is zero (i.e., simply a hole sized to allow passage of the pin of the product picker) then the slot defined in the fixed matrix plate will be the full length of the stroke of the pneumatic cylinder, and the product picker will move by a distance of the stroke.

Alternatively, if the slot associated with any product picker in the movable matrix plate is the length of the stroke of the pneumatic cylinder, then the slot defined in the fixed matrix plate will simply be a hole sized to allow passage of the pin of the product picker, and the product picker will remain in a fixed location.

Figure 13:
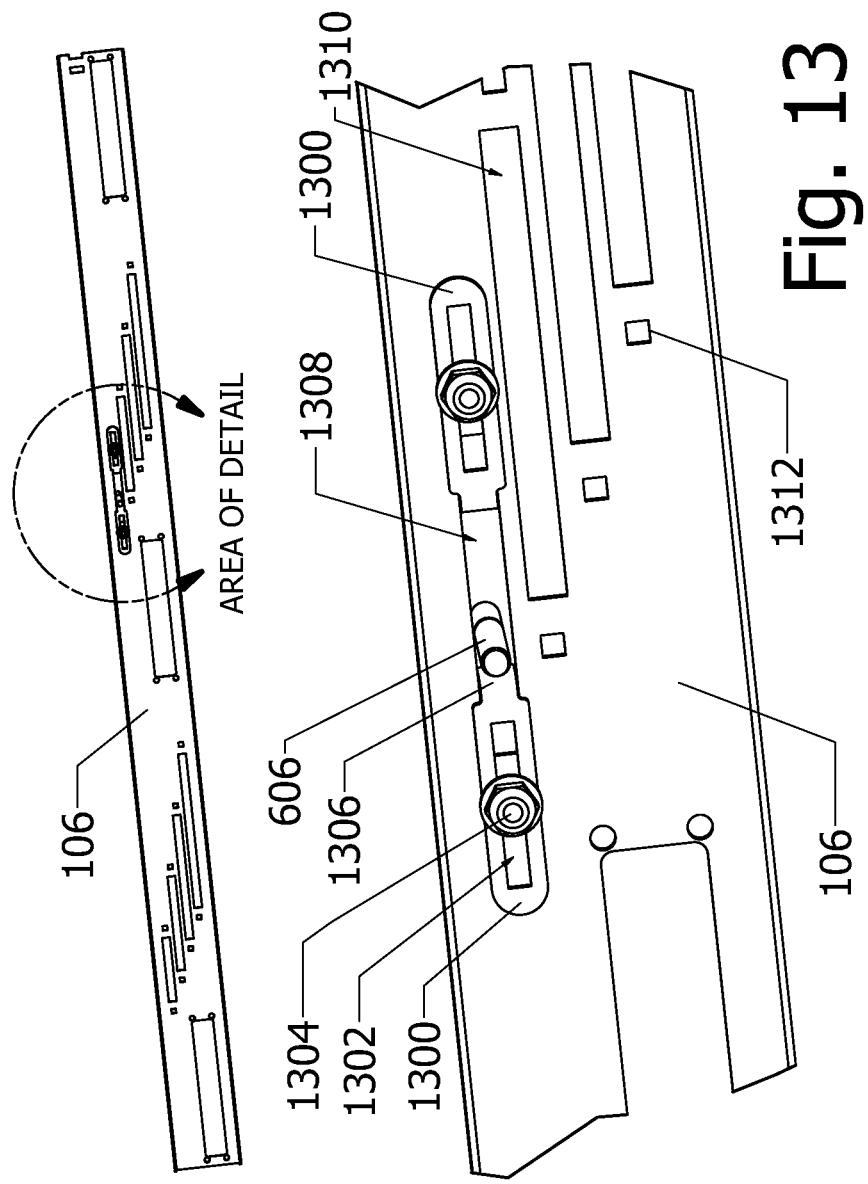
FIG. 13 shows an example of a slot length adjuster, used to limit travel of a pin of a product picker within a slot defined in either one of the movable matrix plates or the fixed matrix plate, as seen from a front side of a matrix plate.

FIG. 13 shows an example of a slot length adjuster 1300, used to limit travel of a pin of a product picker within a slot defined in either one of the movable matrix plates or the fixed matrix plate. The view of FIG. 13 is seen from the front side of the matrix plate 106. The slot length adjuster 1300 allows the length of a slot (e.g., slots 116, 118 of FIG. 1) to be shortened, if desired. In particular, the slot length adjuster 1300 will come into contact with the pin of a product picker, rather than the end of the slot. Such shortening of the slot length results in movement of a product picker—having a pin passing through the shortened slot—over a different distance than would otherwise be the case. Thus, the slot length adjuster 1300 allows incremental "reprogramming" of a slot within one of the movable matrix plates 102, 106 or the fixed matrix plate 402.

A slot 1302 is defined in the example slot length adjuster 1300, allowing a bolt 1304 or other fastener to pass through the slot length adjuster and matrix plate, and to thereby secure the slot length adjuster to the matrix plate. Additionally, the slot 1302 in the slot length adjuster 1300 allows the slot length adjuster to be moved left or right by approximately a length of the slot 1302. A flange 1306 (better seen in FIG. 14) extending from the slot length adjuster 1300 passes through the slot 1308 defined in the movable matrix plate 106. Accordingly, an end of the slot 1308 is defined by the flange 1306. Note that slot length adjusters 1300 may be applied to zero, one or two ends of the slot 1308 defined in the matrix plate.

A further slot 1310 is defined in the movable matrix plate 106, but is shown without a slot length adjuster. A bolt hole 1312 is sized to accept a bolt or other fastener, which may be similar to bolt 1304. Accordingly, each slot defined in the matrix plate may accept slot length adjusters in one or both ends.

Figure 14:
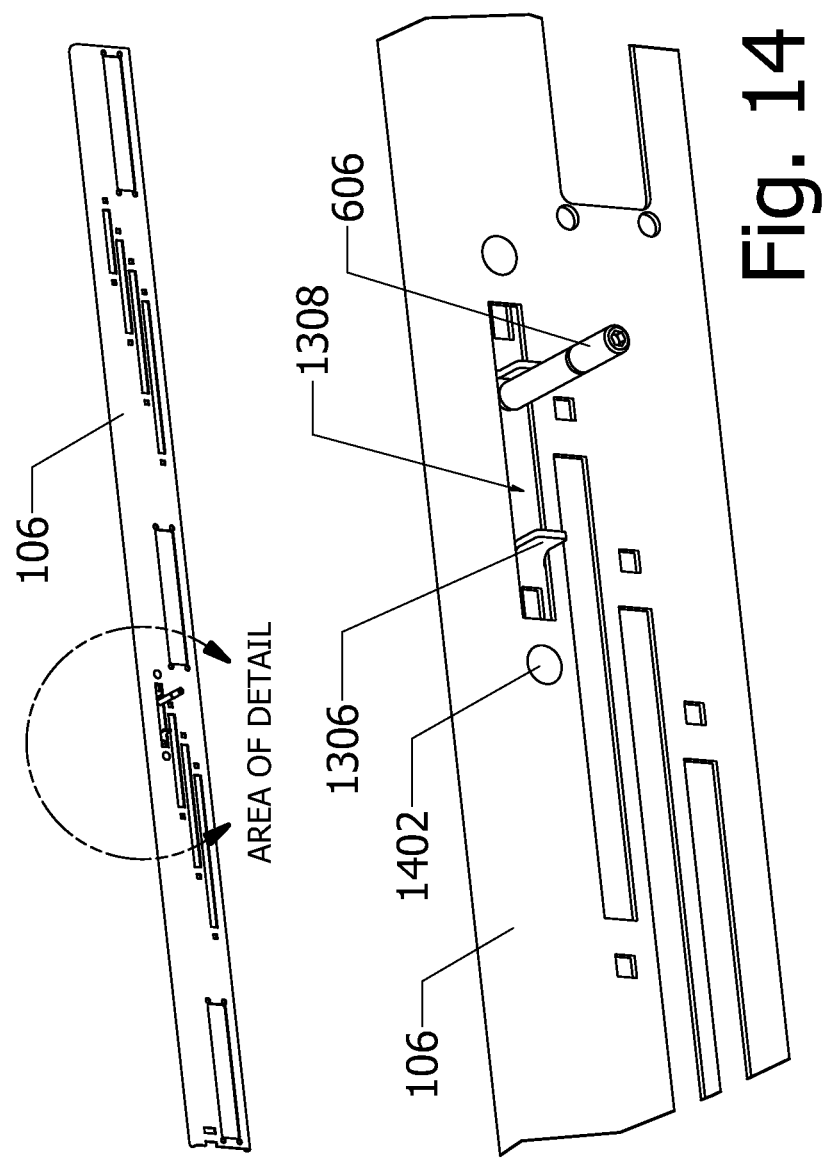
FIG. 14 shows an example of a slot length adjuster, as seen from a rear side of a matrix plate.

FIG. 14 shows an example of a slot length adjuster, as seen from a rear side of a matrix plate 106. In particular, the flange 1306 is seen extending through the slot 1308 defined in the matrix plate 106. The head 1402 of a bolt securing a slot length adjuster is also seen. The flange of a second slot length adjuster is also seen in contact with a pin 606 extending from a product picker (not seen in this view).

Example Control Structure

Figure 15:
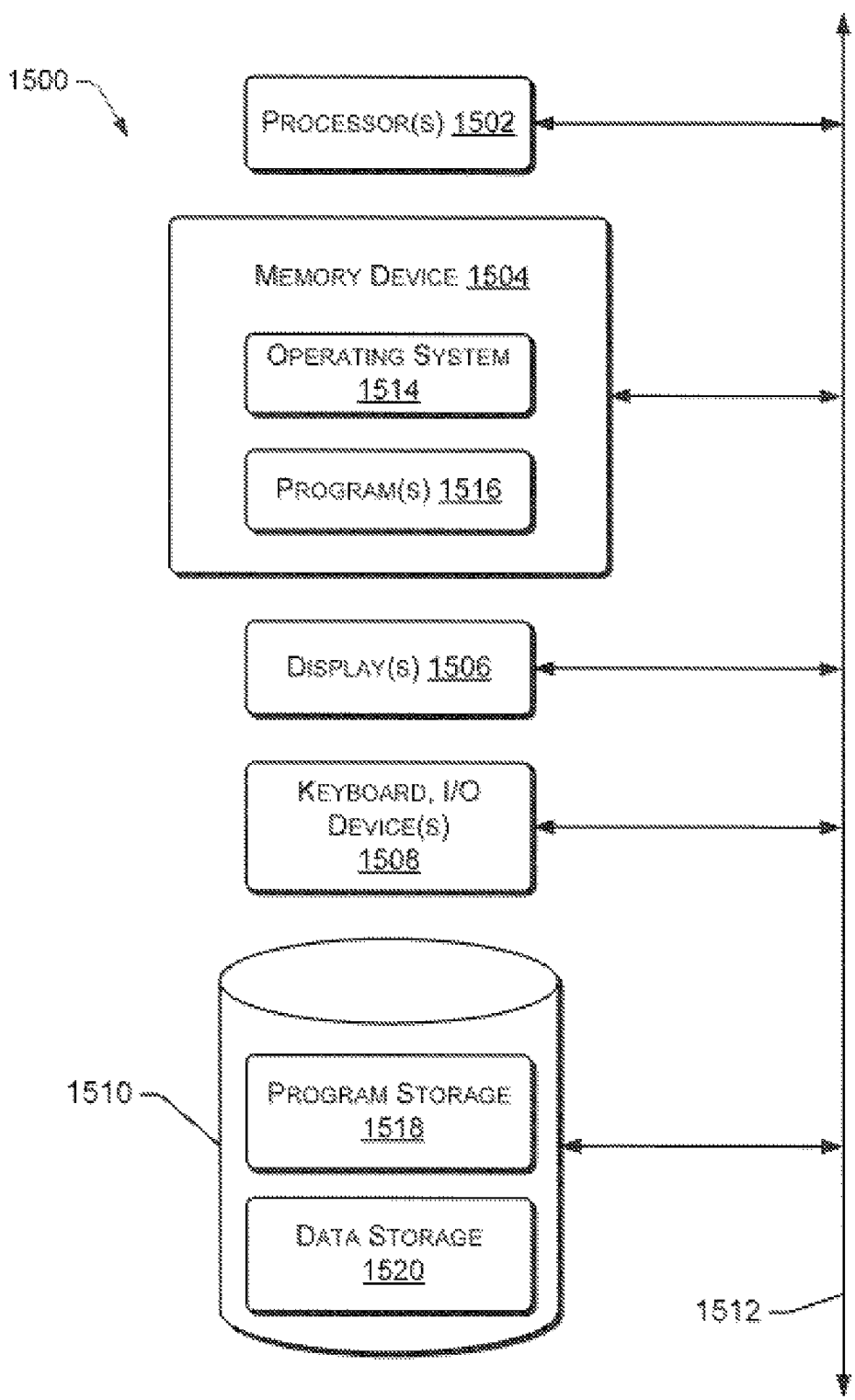
FIG. 15 shows an example of an electronic control structure adapted to command and operate a programmable product picking apparatus.

FIG. 15 is a block diagram showing an example of an electronic control structure 1500 adapted to command and operate a programmable product picking apparatus. In particular, the control structure 1500 is configured to move the right-then-left movable matrix plate and the left-then-right movable matrix plate in a cyclical manner. The electronic control structure 1500 may include a processor 1502 that is in communication with a memory device 1504, a visual or video display 1506, a keyboard and/or other I/O device 1508, and a disk memory device 1510 over a bus 1512 or other communication pathway. The processor 1502 may include a micro processor, application specific integrated circuit (ASIC) and/or other information processing device(s). The memory device 1504 can be a random access device (RAM) or other device and/or technology, as indicated by the needs of a particular application. The memory device 1504 may include an operating system 1514 and one or more programs 1516. Such programs 1516 can include computer-readable and/or processor readable statements, which when executed by the processor 1502, result in execution of one or more methods, such as methods of operating a programmable product picking apparatus. For example, the timing and operation of a valve controlling pneumatic cylinders 104, 108 (e.g., see FIG. 1) may be controlled. The memory device 1510 may include program storage 1518 and data storage 1520, and may additionally contain information from memory 1504 during periods of non-operation. Additionally, the electronic control structure 1500 may be configured to store, in a memory communicatively coupled to a processor, computer-executable instructions for performing the method of operating a programmable product picking apparatus, executing the instructions on the processor, and then, according to the instructions being executed operate the programmable product picking apparatus.

Example Flow Diagrams

Figure 16:
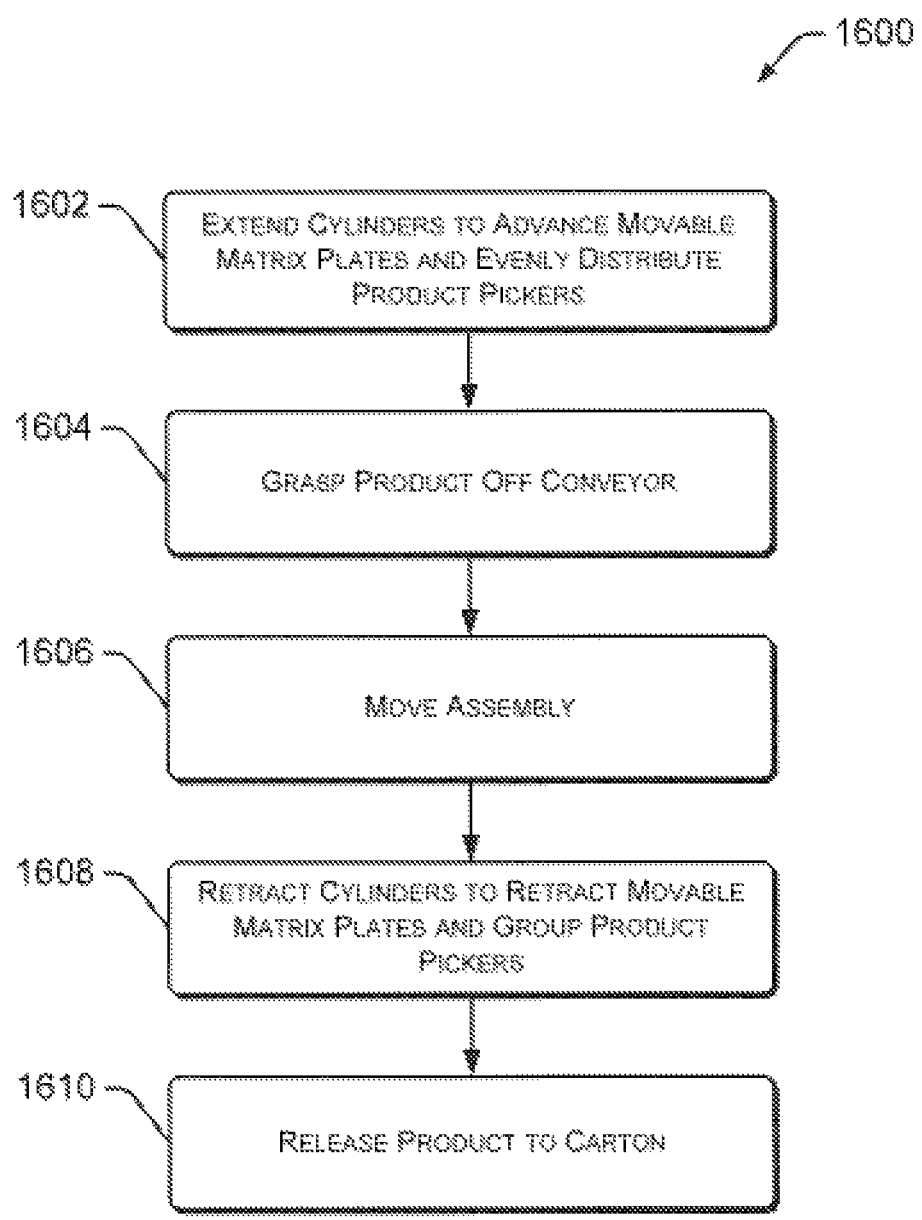
FIG. 16 shows a flow diagram illustrating an example of programmable product picking apparatus operation.

FIG. 16 shows an example process 1600 for providing operating a programmable product picking apparatus. The example process 1600 can be understood in part by reference the configuration of FIGS. 1-15. However, process 1500 includes aspects that are of general applicability, which are not limited by other drawing figures and/or prior discussion.

Each process described herein is illustrated as a collection of blocks in a logical flow graph, which represent a sequence of operations that can be implemented in hardware, software, or a combination thereof In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The above discussion may apply to other processes described herein.

At operation 1602, pneumatic cylinders are extended to advance movable matrix plates and to evenly distribute product pickers. In one example of this operation, the pneumatic cylinders 104, 108 of FIG. 1 are fully extended, resulting in evenly distributed product pickers 110. At operation 1604, product is grasped, such as off a conveyor or other location. In one example of this operation, the low or negative air pressure of the cavity 1102 (as seen in FIG. 11) is used to provide a partial vacuum used by the grippers 312 to grasp product. At operation 1606, the assembly may be moved. For example, the programmable product picking apparatus 100 of FIG. 6 contains attachment plates 602, 604 which may be used to connect the apparatus 100 to a gantry, robot arm or other moving device, to move the product pickers 110 to an appropriate location. At operation 1608, pneumatic cylinders are retracted to withdraw movable matrix plates and to form one or more clustered groups of product pickers. In one example of this operation, the pneumatic cylinders 104, 108 of FIG. 2 are fully retracted, resulting in two clusters of product pickers 110. Note that extension and retraction of pneumatic cylinders is by way of example only. By attachment of the cylinders to opposite ends of the movable matrix plates, for example, the retraction and extension would be reversed. Similarly, the use of cylinders should be considered only an example of one type of power supply that can be used to move the movable matrix plates, which is not meant to limit the scope of applicable power devices. Accordingly, motors or other mechanical power sources could be substituted. At operation 1610, the product is released, such as into a carton or other desired location. By release of the partial vacuum attaching product to the grippers 312 (e.g., FIG. 3) the product can be released. The release may be accomplished by operation of one or more valves. Moreover, while use of partial vacuum has been discussed, mechanical grippers—e.g., using gripping fingers—might be substituted. The process 1600 may be repeated in a cyclical manner, to repeated move the right-then-left movable matrix plate and the left-then-right movable matrix plate in a repetitive manner.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A product picking apparatus, comprising:
   a frame;
   a fixed matrix plate, supported by the frame, defining at least a first row of slots and a second row of slots;
   a right-then-left movable matrix plate, movable parallel to the fixed matrix plate, defining at least a first row of slots at an elevation of the first row of slots defined in the fixed matrix plate;
   a left-then-right movable matrix plate, movable parallel to the fixed matrix plate, defining at least a first row of slots at an elevation of the second row of slots defined in the fixed matrix plate, wherein the right-then-left movable matrix plate moves right when the left-then-right movable matrix plate moves left, and wherein the right-then-left movable matrix plate moves left when the left-then-right movable matrix plate moves right;
   a first product picker, supported by the frame for movement parallel to the fixed matrix plate, the movement in response to movement of the right-then-left movable matrix plate; and
   a second product picker, supported by the frame for movement parallel to the fixed matrix plate, the movement in response to movement of the left-then-right movable matrix plate.

2. The product picking apparatus of claim 1, additionally comprising:
   a slot length adjuster, installed in a slot defined in either of the right-then-left movable matrix plate, the left-then-right movable matrix plate or the fixed matrix plate, to shorten a travel length of the slot.

3. The product picking apparatus of claim 1, additionally comprising:
   a pin, extending from the first product picker, passing through a slot defined in the fixed matrix plate, and passing through a slot defined in the right-then-left movable matrix plate, wherein a combined length of the slot in the fixed matrix plate and a length of a slot in the right-then-left movable matrix plate corresponds to a stroke length of a cylinder driving the right-then-left movable matrix plate.

4. The product picking apparatus of claim 1, additionally comprising:
   a fastener, to attach the fixed matrix plate, the left-then-right movable matrix plate and the right-then-left movable matrix plate to the frame, and to allow removal and replacement of the fixed matrix plate, the left-then-right movable matrix plate and the right-then-left movable matrix plate, to thereby reprogram the product picking apparatus.

5. The product picking apparatus of claim 1, additionally comprising:
   first and second drive cylinders to move the right-then-left movable matrix plate and the left-then-right movable matrix plate, respectively.

6. The product picking apparatus of claim 1, wherein the frame comprises:
   a cavity;
   at least one exhaust port, to allow extraction of air from within the cavity; and
   a plurality of connectors to allow attachment to exhaust tubes from each of a plurality of product pickers.

7. The product picking apparatus of claim 1, additionally comprising:
   first and second guide rods, parallel to the frame, to allow travel of the first and second product pickers;
   first and second bearing surfaces connected to the first product picker and sliding on the first and second guide rods, respectively, wherein the second bearing surface is offset horizontally from the first bearing surface; and
   first and second bearing surfaces connected to the second product picker and sliding on the first and second guide rods, respectively, wherein the second bearing surface is offset horizontally from the first bearing surface.

8. The product picking apparatus of claim 1, additionally comprising:
   a plurality of rows of slots defined in the right-then-left movable matrix plate and corresponding to a first plurality of rows of slots defined in the fixed matrix plate; and
   a plurality of rows of slots defined in the left-then-right movable matrix plate and corresponding to a second plurality of rows of slots defined in the fixed matrix plate.

9. The product picking apparatus of claim 1, additionally comprising:
   a plurality of product pickers, each of the plurality of product pickers comprising a pin attachment plate defining a plurality of pin attachment points organized according into two groups, a first group associated with rows of slots defined in the right-then-left movable matrix plate and a second group of pin attachment points associated with rows of slots defined in the left-then-right movable matrix plate.

10. A programmable product picking apparatus, comprising:
    a plenum, defining a region of low air pressure;
    a fixed matrix plate, supported by the plenum, defining at least a first row of slots and a second row of slots;
    a right-then-left movable matrix plate, movable parallel to the fixed matrix plate by operation of a first drive unit, the right-then-left movable matrix plate defining at least a first row of slots at an elevation of the first row of slots defined in the fixed matrix plate;
    a left-then-right movable matrix plate, movable parallel to the fixed matrix plate by a second drive unit, the left-then-right movable matrix plate defining at least a first row of slots at an elevation of the second row of slots defined in the fixed matrix plate;
    a first plurality of product pickers, supported by first and second guide rods parallel to the fixed matrix plate, connected to the region of low air pressure, moved in response to movement of the right-then-left movable matrix plate, and stopped in response to contact with an end of a slot, the slot among a first plurality of rows of slots defined in the fixed matrix plate; and
    a second plurality of product pickers, supported by first and second guide rods parallel to the fixed matrix plate, connected to the region of low air pressure, moved in response to movement of the left-then-right movable matrix plate, and stopped in response to contact with an end of a slot, the slot among a second plurality of rows of slots defined in the fixed matrix plate.

11. The programmable product picking apparatus of claim 10, additionally comprising:
    a slot length adjuster, installed in a slot defined in either of the right-then-left movable matrix plate, the left-then-right movable matrix plate or the fixed matrix plate, to shorten a travel length of the slot.

12. The programmable product picking apparatus of claim 10, additionally comprising:
a pin, extending from a first product picker, passing through a slot defined in the fixed matrix plate, and passing through a slot defined in the right-then-left movable matrix plate, wherein a combined length of the slot in the fixed matrix plate and a length of a slot in the right-then-left movable matrix plate corresponds to a stroke length of a cylinder driving the right-then-left movable matrix plate.

13. The programmable product picking apparatus of claim 10, additionally comprising:
a control structure, configured to move the right-then-left movable matrix plate and the left-then-right movable matrix plate in a cyclical manner, wherein:
when moving, the right-then-left movable matrix plate and the left-then-right movable matrix plate move in opposite directions;
at a first point in the cycle the first plurality of product pickers and the second plurality of product pickers are evenly spaced; and
at a second point in the cycle the first plurality of product pickers and the second plurality of product pickers are grouped into at least two groups, each of the at least two groups comprising product pickers that moved from the left into the group and product pickers that moved from the right into the group.

14. The product picking apparatus of claim 10, additionally comprising:
a plurality of rows of slots defined in the right-then-left movable matrix plate and corresponding to a first plurality of rows of slots defined in the fixed matrix plate; and
a plurality of rows of slots defined in the left-then-right movable matrix plate and corresponding to a second plurality of rows of slots defined in the fixed matrix plate.

15. The programmable product picking apparatus of claim 10, wherein:
each product picker from among the first and second pluralities of product pickers comprises first and second bearing surfaces sliding on the first and second guide rods, respectively, and the second bearing surface is offset horizontally from the first bearing surface.

16. A programmable product picking apparatus, comprising:
a plenum, defining a region of low air pressure;
a fixed matrix plate, defining at least a first row of slots and a second row of slots;
a right-then-left movable matrix plate, movable parallel to the fixed matrix plate by operation of a first drive unit, the right-then-left movable matrix plate defining at least a first row of slots positioned to partially overlap with portions of the first row of slots defined in the fixed matrix plate;
a left-then-right movable matrix plate, movable parallel to the fixed matrix plate by a second drive unit, the left-then-right movable matrix plate defining at least a first row of slots positioned to partially overlap with portions of the second row of slots defined in the fixed matrix plate;
a first plurality of product pickers, supported by first and second guide rods parallel to the fixed matrix plate, each of the first plurality of product pickers connected to the region of low air pressure, moved in response to movement of the right-then-left movable matrix plate, and stopped in response to contact with an end of a slot, the slot among a first plurality of rows of slots defined in the fixed matrix plate;
a second plurality of product pickers, supported by first and second guide rods parallel to the fixed matrix plate, each of the second plurality of product pickers connected to the region of low air pressure, moved in response to movement of the left-then-right movable matrix plate, and stopped in response to contact with an end of a slot, the slot among a first plurality of rows of slots defined in the fixed matrix plate;
a control structure, configured to move the right-then-left movable matrix plate and the left-then-right movable matrix plate in a cycle, wherein:
when moving, the right-then-left movable matrix plate and the left-then-right movable matrix plate move in opposite directions; and
at a first point in the cycle the first plurality of product pickers and the second plurality of product pickers are evenly spaced; and
at a second point in the cycle the first plurality of product pickers and the second plurality of product pickers are grouped into at least two groups, each of the at least two groups comprising product pickers that moved from the left into the group and product pickers that moved from the right into the group.

17. The programmable product picking apparatus of claim 16, additionally comprising:
a slot length adjuster, installed in a slot defined in either of the right-then-left movable matrix plate, the left-then-right movable matrix plate or the fixed matrix plate, to shorten a travel length of the slot.

18. The programmable product picking apparatus of claim 16, wherein
a pin, extending from a first product picker, passing through a slot defined in the fixed matrix plate, and passing through a slot defined in the right-then-left movable matrix plate, wherein a combined length of the slot in the fixed matrix plate and a length of a slot in the right-then-left movable matrix plate corresponds to a stroke length of a cylinder driving the right-then-left movable matrix plate.

19. The programmable product picking apparatus of claim 16, additionally comprising:
a fastener, to attach the fixed matrix plate, the left-then-right movable matrix plate and the right-then-left movable matrix plate to the frame, and to allow removal and replacement of the fixed matrix plate, the left-then-right movable matrix plate and the right-then-left movable matrix plate, to thereby reprogram the programmable product picking apparatus.

20. The programmable product picking apparatus of claim 16, additionally comprising:
a plurality of rows of slots defined in the right-then-left movable matrix plate and corresponding to a first plurality of rows of slots defined in the fixed matrix plate; and
a plurality of rows of slots defined in the left-then-right movable matrix plate and corresponding to a second plurality of rows of slots defined in the fixed matrix plate.

* * * * *